United States Patent Office 3,642,788
Patented Feb. 15, 1972

3,642,788
RACEMIC AND OPTICALLY ACTIVE 6H,7H-CIS-7-AMINO-DESACETYLCEPHALOSPORANIC ACID DERIVATIVES AND PROCESS
René Heymes, Romainville, and Gaston Amiard, Thorigny, France, assignors to Roussel-UCLAF, Paris, France
No Drawing. Filed Mar. 13, 1967, Ser. No. 622,440
Claims priority, application France, Mar. 15, 1966, 53,488; Sept. 30, 1966, 78,320
Int. Cl. C07d 99/24
U.S. Cl. 260—243 C    16 Claims

ABSTRACT OF THE DISCLOSURE

This invention relates to a compound selected from the group consisting of (1) a racemic 6H,7H-cis-7-amino-desacetylcephalosporanic acid derivative of the formula

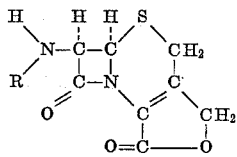

wherein R is selected from the group consisting of hydrogen and triphenylmethyl, (2) its optically active antipodes and (3) when R is hydrogen their acid addition salts. The invention also relates to the process of preparing these compounds. These compounds are intermediates useful in the preparation of cephalosporin antibiotics and the 7-thienylacetylamino derivative possesses an antibiotic activity.

THE PRIOR ART

Racemic or optically active derivatives of 6H,7H-cis-1-amino-desacetylcephalosporanic acid of the Formula I:

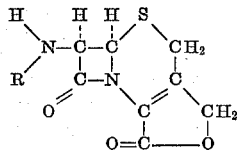

wherein R represents hydrogen or triphenylmethyl (hereinafter called trityl) of the invention possess a stereo chemistry identical to that of 7-aminocephalosporanic acid of natural origin and of its derivatives, in particular the N-acylated derivatives, and the γ-lactone of the 7-amino-desacetylcephalosporanic acid. The presence of this last compound has been suggested, or merely anticipated at various times in the mixtures obtained by conversion or by hydrolysis of Cephalosprorins C and Cc or of 7-amino-cephalosporanic acid. However, neither the isolation nor the description of the said compound have been reported until now in any specific manner.

OBJECTS OF THE INVENTION

An object of the present invention is the obtention of a compound selected from the group consisting of (1) a racemic 6H,7H-cis-7-amino-desacetylcephalosporanic acid derivative of the formula wherein R is selected from the group consisting of hydrogen and triphenylmethyl, (2) its optically active antipodes and (3) when R is hydrogen their acid addition salts, particularly the racemic γ-lactone of d,l-6H,7H-cis-7-amino-desacetylcephalosporanic acid, the dextrorotatory γ-lactone of d-6H,7H-cis-7-amino-desacetylcephalosporanic acid, the levorotatory γ-lactone of l-6H,7H-cis-7-amino-desacetylcephalosporanic acid, their mineral or organic acid addition salts, and their N-tritylated derivatives.

Another object of the present invention is the development of a process for the production of the γ-lactone of the 6H,7H-cis-7-amino-desacetylcephalosporanic acid derivatives of the general Formula I which comprises the steps of (1) subjecting a compound selected from the group consisting of the lactone of 2-(ter-butoxy-carbonyl-aminomethyl)-5-hydroxymethyl-3,6-dihydro-2-H-1,3-thiazine-4-carboxylic acid and its acid addition salts to the action of an acid in an anhydrous medium, (2) reacting the resulting γ-lactone of 2-(carboxy-aminomethyl)-5-hydroxymethyl-3,6-dihydro-2-H-1,3-thiazine-4-carboxylic acid with triphenylmethylchloride in the presence of a basic agent in an aqueous organic solvent medium (3) reacting the resulting γ-lactone of 2-(carboxy-triphenylmethyl-aminomethyl)-5-hydroxymethyl-3,6-dihydro-2-H-1,3-thiazine-4-carboxylic acid with an agent which activates the carboxylic function such as a diimide selected from the group consisting of dialkyl carbodiimides and dicycloalkyl carbodiimides, ethoxyacetylene, etc. and (4) recovering said γ-lactone of the 6H,7H-cis-7-amino-desacetylcephalosporanic acid derivative.

A yet further object of the invention is the obtention of the novel intermediates formed in the above process.

These and other objects of the invention will become more apparent as the description thereof proceeds.

DESCRIPTION OF THE INVENTION

As indicated, the synthetic compounds of the general Formula I possess a stereochemistry identical to that of 7-aminocephalosporanic acid of natural origin. Consequently, the synthetic compounds of the general Formula I of the invention comprises intermediates of choice for the synthesis of antibiotics belonging to the family of Cephalosporin C and its analogues.

Moreover, the compounds of the general Formula I where R=H represent also very interesting raw substances for the preparation of N-acylated compounds possessing remarkable antibiotic properties. Thus, for example, it is possible to prepare the γ-lactone of d,l-6H,7H-cis-7-thienylacetylamino-desacetylcephalosporanic acid

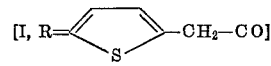

The antibiotic acivity of this compound on different germs has been verified, in particular on many strains of *Staphylococcus aureus* with concentrations of the order of 1 to 10 γ/cc.

Prior to the present invention β-acetylthiomethyl-α-keto-γ-butyrolactone as well as a process for its preparation has been described in the French Pat. No. 1,365,959.

In our copending United States patent application Ser. No. 599,738, filed Dec. 7, 1966, it has been indicated that it was possible to obtain the lactone of 2-(ter-butoxy-carbonyl-phthalimido-methyl-5-hydroxymethyl-3,6-dihydro-2-H-1,3-thiazine-4-carboxylic acid, IV, by condensation of ter-butyl 2-phthalimido-3-amino-acrylate, II, with 1,4 lactone of 2,4-dihydroxy-3-mercaptomethyl-2-butenoic acid, III, this latter compound being prepared by acidolysis of the β-acetylthiomethyl-α-keto-γ-butyrolactone mentioned above.

In the same application, the lactone of the 2-(ter-butoxycarbonyl-aminomethyl) - 5 - hydroxymethyl-3,6-dihydro-2-H-1,3-thiazine-4 carboxylic acid, V, as well as the hydrochloride of this amine, have been described, the compound (V) being obtained by starting with (IV) by elimination of the protective phthalimido group.

A flow diagram of these reactions is given hereafter as Table I.

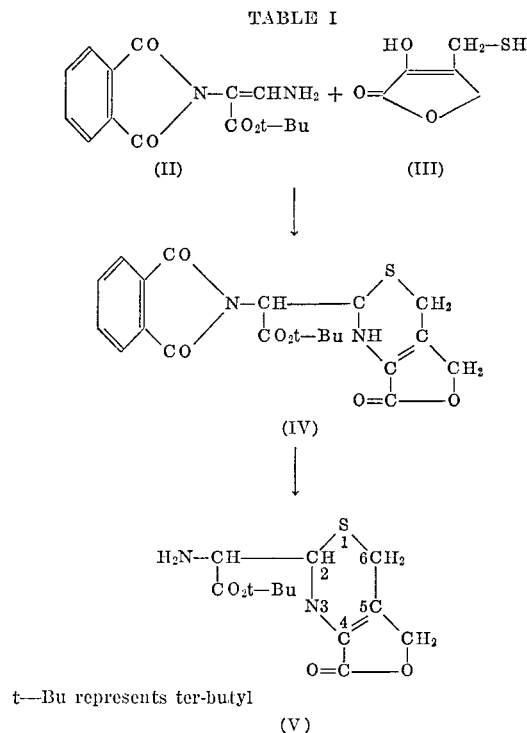

t—Bu represents ter-butyl

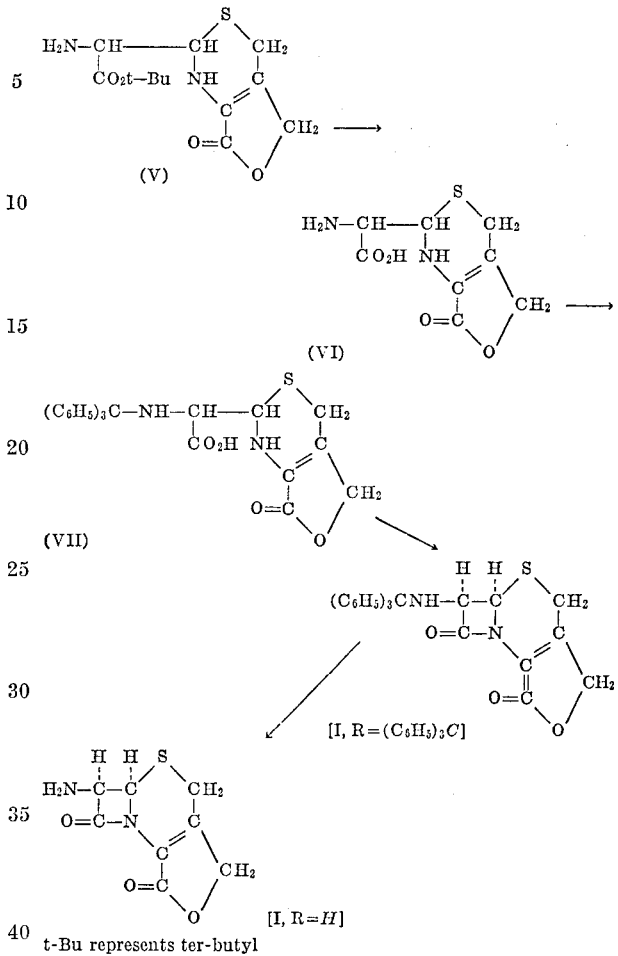

t-Bu represents ter-butyl

The structure of the compounds (IV) and (V) anticipates already that of 7-aminocephalosporanic acid. However, it remained to form the β-lactamic cycle characteristic of this acid. Moreover, this formation could produce, according to the stereochemistry of the starting product, and/or the experimental conditions, two isomers, of which one, namely the cis-isomer, corresponds with the natural series.

Such a cyclization attempted on a compound obtained, for example, by starting with (V) by acidolysis of ter-butyl ester and subsequent blockage of the primary amine function of the lateral chain, would certainly appear to have a doubtful success due, on the one hand, to the low reactivity of the enaminic amine function in the 3-position, and, on the other hand, due to the low chemical stability of the compounds entering into reaction or resulting therefrom.

However, we have now discovered that it is possible to realize the said cyclization by means of an agent which activates the carboxylic function, such as a diimide, ethoxyacetylene, etc., and thus to obtain the cis-isomer corresponding with the natural series.

As far as it is known, this unexpected result opens, for the first time, a way of purely synthetic access to derivatives such as those of the general Formula I possessing at once, at the time of the formation of the bicyclic system, all of the essential structural characteristics of the nucleus of Cephalosporine.

The process for the preparation of these derivatives is summarized in the flow diagram of Table II.

The present invention relates to a process for the preparation of the compounds of Formula I, starting with the lactone of 2-(ter-butoxycarbonyl-aminomethyl)-5-hydroxymethyl - 3,6-dihydro-2-H-1,3-thiazine-4-carboxylic acid, V, or with one of its acid addition salts. This process consists of treating compound V or one of its acid addition salts, in the form of a single isomer or an isomer mixture, with an acid agent in anhydrous medium, to form the γ-lactone of 2-(carboxy-aminomethyl)-5-hydroxymethyl-3,6-dihydro-2-H-1,3-thiazine-4-carboxylic acid, VI, then by reacting the compound VI with triphenylmethyl chloride in the presence of a basic agent, in an aqueous medium. Thereafter, the γ-lactone of the 2-(carboxy - tritylaminomethyl) - 5 - hydroxymethyl-3,6-dihydro-2-H-1,3-thiazine-4-carboxylic acid, VII is treated with a dialkyl or a dicycloalkyl-carbodiimide in polar medium, in the presence of a tertiary amine to obtain the γ-lactone of d,1 - 6H,7H-cis-7-tritylamino-desacetylcephalosporanic acid [I, R=(C₆H₅)₃C].

The said compound [I, R=(C₆H₅)₃C] can be treated, if so desired, with a mineral or organic acid agent, in particular hydrochloric acid, to obtain the γ-lactone of d, 1-6H,7H-cis-7-amino-desacetylcephalosporanic acid, [I, R=H], which, if desired, is resolved by reacting it with an optically-active organic carboxylic or sulfonic acid. The two diastereoisomer salts formed are separated and purified by the usual methods, and each of these salts is decomposed by a mineral or organic base or by an acid agent to obtain the corresponding optically active γ-lactone (I, R=H), which can be converted into a salt by the action of a mineral or organic acid, or converted into an N-trityl derivative by the action of triphenylmethyl chloride.

The racemic compound V can, in principle, exist in two isomeric forms. This also pertains to the racemic compound IV, from which the compound V is derived.

These two isomer series have been successfully isolated and characterized. In fact, the condensation of II with III leads to the simultaneous formation of the two foreseeable isomers for IV. The isomer which is formed in preponderant fashion, and which is easily isolated by means of precipitation and crystallization, has a melting point of 215° C. Now being designated as isomer A, it corresponds with the derivative described in the U.S. patent application No. 599,738.

Accordingly, the second isomer of IV, the isomer B, can be isolated from the mother liquors after separation of the isomer A. It has a melting point of 170° C.

Moreover, it was found that the isomer B of compound IV, by elimination of the protective phthalimido group, allows the preparation of the isomer B corresponding with the compound V, having a melting point of 152° C. It should be remembered that the other isomer V, already characterized, now designated as isomer A, has a melting point of 138° C.

However, it has been ascertained, that the process of the present invention was just as easily applicable to the isomer A as to the isomer B of compound V. In fact, the compound V which can occur in the form of a single isomer or in the form of a mixture of the latter in variable proportion, leads by means of acidolysis to the same compound VI. Therefore, in this reaction a single isomer is isolated, which is formed exclusively or preferentially.

This acidolysis is effected in anhydrous medium, using, as the acid agent, a mineral or organic acid, such as hydrochloric acid, hydrobromic acid, p-toluene sulfonic acid, a mixture of hydrobromic and acetic acids, or trifluoroacetic acid. Although it is not indispensible, it is often advantageous to conduct this acidolysis in an anhydrous organic solvent, such as benzene, toluene, ether, dioxane, nitromethane, or a polyhalogenated hydrocarbon, such as chloroform or methylene chloride.

In a mode of execution actually preferred, hydrochloric acid is employed as the acid agent, and the reaction is carried out in nitromethane as the anhydrous medium.

The formation of the N-trityl derivative, VII, starting wyith VI, is effected with the aid of trityl chloride. The reaction is conducted in aqueous medium in the presence of a basic agent, such as an alkali metal hydroxide, or a strong organic base, preferably a secondary or tertiary amine such as diethylamine or triethylamine. It is of advantage to add another water-miscible organic solvent, such as an ether or an aliphatic alcohol.

In a method of execution presently preferred, diethylamine in a water-isopropanol medium is employed as the basic agent.

The cyclization with the aid of a diimide of the compound VII into a compound of type I presents substantial difficulties. In fact, if this reaction is effected in a dioxane-water medium, the anticipated $\beta$-lactam is not formed, but a compound is obtained, which probably corresponds with the anhydride of the compound VII. The same difficulty is encountered, when the reaction is conducted in a solvent, such as chloroform or methylene chloride. In the case where the reaction is effected in the presence of a tertiary base, the reaction does proceed, but, very slowly and incomplete, and the formation of the $\beta$-lactam, if it does occur, is accompanied by numerous secondary reactions. It has now been ascertained, that the addition of a strongly polar solvent promotes in an unexpected matter the cyclization to the $\beta$-lactam and leads to a very good yield of the racemic compound [I, R=trityl].

To make this conversion, a diimide of the di-alkyl carbodiimide type, such as the di-isopropyl carbodiimide, or of the di-cycloalkyl carbodiimide type, such as di-cyclohexyl carbodiimide, is utilized. It is preferable to select as the tertiary amine a relatively weak base, such as pyridine, collidine, dialkylaniline, etc. The strongly polar solvent is preferably, for example, a nitroalkane, particularly, nitromethane, acetone, acetonitrile, a di-substituted amide or a sulfoxide. The hydroxylated solvents are not desirable. It is also advantageous, particularly considering the solubility of the reactants, to utilize not just one single solvent, but a mixture of two or more solvents. In this case, it is permitted to select as the additional solvent, a slightly polar solvent, such as chloroform or methylene chloride.

The preferred mode of execution consists in treating compound VII with di-cyclohexyl carbodiimide, working in a mixed solvent medium of nitromethane and methylene chloride, in the presence of pyridine.

To obtain the racemic compound, the $\gamma$-lactone of 6H,7H - cis - 7 - amino-desacetylcephalosporanic acid (I, R=H), the previously tritylated amine is treated with a mineral or an organic acid agent, such as hydrochloric acid, hydrofluoric acid, acetic acid or trofluoroacetic acid. The reaction can be conducted in anhydrous medium using as solvent, for example, chloroform, methylene chloride, nitromethane, methanol or trifluoroacetic acid itself, or by using a mixture of solvents or advantageously by working in an aqueous medium with possible addition of another organic solvent, such as ethanol, acetonitrile or acetone.

It seems advantageous to utilize gaseous hydrochloric acid and to work in the presence of nitromethane.

To effect the resolution of the racemic $\gamma$-lactone (I, R=H), conventional optically-active organic acids can be used, having one or several carboxylic or sulfonic acid functions. In particular, (+) camphosulfonic acid, (+) dibenzoyl-tartaric acid, (+) glutamic acid and (+) tartaric acid leads to the desired result. The diastereoisomeric salts are then separated and purified by conventional methods.

The decomposition of the isolated and purified diasterioisomeric salt can be accomplished with the aid of a mineral base, preferably, an alkali metal hydroxide, such as sodium hydroxide or potassium hydroxide, or with the aid of an organic base, such as a tertiary amine, for example, triethylamine, or likewise with an acid agent as, for example, hydrochloric acid. This decomposition is effected in an aqueous medium or in an organic solvent, such as ethanol or methanol.

In a mode of execution presently perferred, the resolution is realized with the aid of natural (+) tartaric acid. The salt formation is conducted utilizing the $\gamma$-lactone and the tartaric acid in the free form.

Under these conditions, the precipitated diastereoisomeric salt corresponds with that of the natural series. The decomposition of this salt into the free base is effected preferably with triethylamine in a methanolic medium. In this manner, the dextrorotatory $\gamma$-lactone of di-6H,7H-cis-7-amino-desacetylcephalosporanic acid (I, R=H), is isolated, whose absolute configuration corresponds with that of 6-amino-cephalosporanic acid of a natural origin.

The antipodal $\gamma$-lactone can be obtained starting with the mother liquors after removal of the precipitated diastereoisomeric salt of the natural series, or, even directly, by resolution with the aid of (—) tartaric acid.

A variation of this process consists essentially in that the racemic $\gamma$-lactone (I, R=H), in the form of a salt, in particular the hydrochloride, is reacted with an optically-active organic carboxylic acid or organic sulfonic acid in the form of a salt such as an alkali metal salt or an ammonium salt. The remainder of the described process is similar.

The free base of compound I, when R is H, can be reacted with an acid to form the corresponding acid addition salt. Preferentially, the hydrochloride is formed, but it is obvious that any acid addition salt of mineral and organic acids can be formed such as the hydrobromide, the sulfate, the acetate, etc.

The following examples are illustrated of the invention. However, it is to be understood that they do not limit the invention in any manner.

PREPARATION I

Lactone of 2 - (ter-butoxycarbonyl - phthalimidomethyl) - 5-hydroxymethyl - 3,6 - dihydro - H - 1,3 - thiazine 4-carboxylic acid, isomer B, IV The preparation of the lactone of 2-(ter-butoxy-carbonyl-phthalimidomethyl) - 5 - hydroxymethyl-3,6-dihydro-2-H-1,3-thiazine-4-carboxylic acid has been described in our United States patent application Ser. No. 599,738. This compound was obtained by condensation in a toluene medium of the 1,4-lactone of 2,4-dihydroxy-3-mercapto-methyl-2-butenoic acid with ter-butyl 2-phthalimido-3-amino-acrylate. After the evaporation of the toluene, the residue was taken up with ether and a precipitate was formed, which was isolated by filtration and drying. The product thus obtained, having a melting point of 215° C. was composed of one of the two isomers of the lactone of 2-(ter-butoxycarbonyl - phthalimidomethyl) - 5 - hydroxymethyl-3,6-dihydro-2-H-1,3-thiazine - 4 - carboxylic acid and designated as isomer A in the following.

The isolation of the isomer B of the same lactone, starting with the ethereal mother liquors of the isomer A, obtained after filtration of the latter as described above, as well as the preparation of the isomer B starting with the isomer A, is described in the following.

(a) Isolation of the isomer B of the lactone of 2-(ter-butoxycarbonyl-phthalimidomethyl) - 5 - hydroxymethyl-3,6-dihydro-2-H-1,3-thiazine-4-carboxylic acid by starting with the ethereal mother liquors of the isomer A.—After having been dried over sodium sulfate, the ethereal mother liquors, as obtained above, were concentrated to dryness under reduced pressure.

The residue was taken up with methylene chloride. An insoluble matter, consisting of bis-[(2-oxo-3-hydroxy-2,5-dihydro-4-furanyl)-methyl]-sulfide, was first vacuum filtered from the solution. The filtered solution was subjected to chromatography through alumina with successive elutions first with benzene, then with ether and finally with ethyl acetate. The last eluate obtained (ethyl acetate) was concentrated to dryness under reduced pressure. The resultant residue was crystallized from ether. A first yield was obtained which was discarded. Then by means of concentration, a second lot of crystals was obtained rich in isomer B. This second lot of crystals was twice recrystallized from a mixture of methylene chloride and methanol, thus obtaining the isomer B of the lactone of 2 - (ter-butoxycarbonyl - phthalimidomethyl) - 5 - hydroxymethyl - 3,6 - dihydro-2-H-1,3-thiazine-4-carboxylic acid, IV. The product had a melting point of 170° C.

*Analysis.*—$C_{20}H_{20}O_6N_2S$; molecular weight=416.44. Calculated (percent): C, 57.68; H, 4.84; N, 6.73; S, 7.70. Found (percent): C, 57.6; H, 4.9; N, 7.0; S, 7.7.

Infrared spectra (in Nujol):

Absorptions at: 1,708 cm.$^{-1}$, 1,733 cm.$^{-1}$, 1,763 cm.$^{-1}$: showing presence of the carbonyl group, and at: 3,330 cm.$^{-1}$: showing presence of a secondary amine.

(b) Preparation of the isomer B of the lactone of 2-(ter-butoxycarbonyl - phthalimidomethyl) - 5 - hydroxymethyl-3,6-dihydro - 2 - H - 1,3 - thiazine - 4 - carboxylic acid by starting with the isomer A.—5 gm. of the isomer A of the lactone of 2-(ter-butoxycarbonyl-phthalimidomethyl) - 5 - hydroxymethyl - 3,6 - dihydro-2-H-1,3-thiazine-4-carboxylic acid, with a melting point of 215° C. and obtained in the manner as previously described, were introduced into a mixture of 100 cc. of dioxane and 5 cc. of triethylamine.

The reaction mixture was maintained at reflux over a period of 15 hours, then it was concentrated to dryness under reduced pressure. The residue was taken up with 20 cc. of hot ether. The unconverted isomer A was isolated by vacuum filtration (3.5 gm.), and the ethereal filtrate was concentrated to dryness under reduced pressure. The residue was recrystallized several times from a mixture of methylene chloride and methanol, and after having been dried, the isomer B of the lactone of 2-(ter-butoxycarbonylphthalimidomethyl) - 5 - hydroxymethyl-3,6-dihydro-2H-1,3-thiazine-b-carboxylic acid, IV, was obtained, having a melting point of 170° C., identical to the isolated product described in paragraph (a).

PREPARATION II

Preparation of the lactone of 2-(ter-butoxycarbonyl-aminomethyl)-5-hydroxymethyl-3,6-dihydro-2-H-1,3-thiazine-4-carboxylic acid, V, isomer B (a) Preparation of the hydrochloride.—625 mg. of lactone of 2 - (ter-butoxycarbonylphthalimidomethyl)-5-hydroxymethyl - 3,6 - dihydro - 2-H-1,3-thiazine-4-carboxylic acid, isomer B, IV, having a melting point of 170° C., were dissolved in 5 cc. of dioxane. Then 95 mg. of hydrazine hydrate, dissolved in 5 cc. of dioxane, were added. The reaction mixture was allowed to stand for about 15 hours. Thereafter, it was concentrated to dryness under reduced pressure, and 9.5 cc. of an aqueous solution of 0.2 N hydrochloric acid were added to the residue. The reaction mixture was agitated for 2 hours, then cooled. The precipitate of phthalhydrazide formed was isolated by filtration. The filtrate was concentrated to dryness under reduced pressure. The resultant residue was crystallized from an ether-methanol mixture. The product obtained was dissolved in 2 cc. of water. The solution was filtered and concentrated to dryness under reduced pressure. The residue was recrystallized from an ether-methanol mixture. 360 mg. of the hydrochloride salt of isomer B of the lactone of 2-(ter-butoxycarbonyl-aminomethyl) - 5 - hydroxymethyl - 3,6-dihydro-2-H-1,3-thiazine - 4 - carboxylic acid were obtained. This product was utilized as such for the next step of the synthesis and for the preparation of the free amine.

(b) Preparation of the free amine.—The hydrochloride salt obtained in the above process [Preparation II, paragraph (a)] was dissolved in methylene chloride and agitated with a saturated solution of sodium bicarbonate in an amount corresponding with an equivalent proportion of the hydrochloric acid in the hydrochloride salt. The organic phase was separated by decanting, dried over magnesium sulfate and concentrated to dryness under reduced pressure. The residue was rcystallized from ethyl acetate, thus obtaining the isomer B of the lactone of 2-(ter-butoxycarbonyl-aminomethyl) - 5 - hydroxymethyl-3,6 - dihydro - 2-H-I,3-thiazine-4-carboxylic acid. The product had a melting point of 152° C.

*Analysis.*—$C_{12}H_{18}O_4N_2S$; molecular weight=286.36. Calculated (percent): C, 50.33; H, 6.33; N, 9.79; S, 11.20. Found (percent): C, 50.4; H, 6.4; N, 9.5; S, 11.2.

Infrared spectra (in chloroform):

Absorptions at:
 1,762 cm.$^{-1}$: γ-lactone
 1,688 cm.$^{-1}$: carbon-carbon double bond
 1,732 cm.$^{-1}$: carboter-butoxy group
 3,390 cm.$^{-1}$, 3,370 cm.$^{-1}$, 3,320 cm.$^{-1}$: secondary amine.

EXAMPLE I

Preparation of the γ-lactone of d,l-6H,7H-cis-7-tritylamino-desacetylcephalosporanic acid (I, R=$(C_6H_5)_3C$—)

Step A: Preparation of the γ-lactone of 2-(carboxyaminomethyl) - 5 - hydroxymethyl - 3,6 - dihydro - 2-H-1,3 - thiazine - 4 - carboxylic acid, VI.—3.22 gm. of hydrochloride of the lactone of 2-(ter-butoxycarbonyl-aminomethyl) - 5 - hydroxymethyl - 3,6 - dihydro-2-H-1,3-thiazine-4-carboxylic acid, having a melting point of 180° C. (with decomposition) described in our United States patent application Ser. No. 599,738 and indicated hereafter as isomer A, were placed in suspension in 160 cc. of nitromethane. For about 30 minutes a stream of hydrogen chloride was passed through the suspension, while maintaining a temperature of about +5° C. Then the suspension was concentrated to dryness under reduced pressure. The residue was dissolved in 3 cc. of water, and first 1.5 cc. of pyridine, then 30 cc. of alcohol were added. The precipitate formed was vacuum filtered and dried. In this manner, 1.89 gm. of γ-lactone of 2-(carboxy-aminomethyl) - 5 - hydroxymethyl - 3,6-dihydro-2 - H-1,3-thiazine-4-carboxylic acid, VI, were obtained, having a melting point of 230° C. with decomposition.

A sample of this product was recrystallized from a mixture of alcohol and water in order to effect the analysis.

The following solvate was obtained: $C_8H_{10}O_4N_2S$, ¼$C_2H_5OH$, stable at 100° C.

The characteristics of this product are indicated as follows:

Analysis.—$C_8H_{10}O_4N_2S$, ¼$C_2H_5OH$; molecular weight =241.74. Calculated (percent): C, 42.23; H, 4.76; S, 13.27. Found (percent): C, 42.1; H, 4.5; S, 13.3.

Infrared spectra (in Nujol):

Absorptions at:
 1,674 cm.$^{-1}$: carbon-carbon double bond
 1,730 cm.$^{-1}$: carbonyl
 3,470 cm.$^{-1}$: secondary amine This product is not described in the literature.

By starting with isomer B of the hydrochloride of the lactone of 2 - (ter-butoxycarbonyl-aminomethyl)-5-hydroxymethyl - 3,6 - dihydro - 2-H-1,3-thiazine-4-carboxylic acid, described in Preparation II, paragraph (a), in the same manner and with an analogous yield, the same γ-lactone VI, was obtained, previously described with the same physical constants.

Step B: Preparation of γ-lactone of 2-(carboxy-tritylaminomethyl) - 5 - hydroxymethyl-3,6-dihydro-2-H-1,3-thiazone-4-carboxylic acid, VII.—1.84 gm. of γ-lactone of 2-(carboxy-aminomethyl) - 5 - hydroxymethyl-3,6-dihydro-2-H-1,3-thiazine-4-carboxylic acid, VI, were dissolved in 40 cc. of water; then 8 cc. of isopropanol, next 24 cc. of an M diethylamine solution and finally 4.48 gm. of powdered trityl chloride were added to the solution. This mixture was agitated for about 15 hours at a temperature of +5° C.; thereafter, 120 cc. of water and 4 cc. of acetic acid were added. Next, the reaction mixture was agitated for 15 minutes and vacuum filtered. The precipitate was washed with water, then with ether to remove the triphenylcarbinol, and dried. In this manner, 1.88 gm. of γ-lactone of 2-(carboxy-tritylaminomethyl)-5-hydroxymethyl-3,6-dihydro-2-H-1,3-thiazine - 4 - carboxylic acid, VII, were obtained, with a melting point of 210-220° C., with decomposition.

Acidimetric titration: Exactly 1 equivalent of N sodium hydroxide (aqueous dioxane solution, phenolphthalein endpoint) was consumed.

For the purpose of analysis, a sample was crystallized from methylene chloride, and the following solvate was obtained: $C_{27}H_{24}O_4N_2S$, 0.15 $CH_2Cl_2$.

Analysis.—$C_{27}H_{24}O_4N_2S$, 0.15 $CH_2Cl_2$; molecular weight=485.14. Calculated (percent): C, 67.21; H, 5.1; N, 5.77; S, 6.6; Cl, 2.16. Found (percent): C, 67.0; H, 5.2; N, 5.5; S, 6.1; Cl, 2.1.

Infrared spectra (in Nujol):

Absorptions at:
 1,732 cm.$^{-1}$: γ-lactone
 1,717 cm.$^{-1}$: carboxyl
 1,679 cm.$^{-1}$: carbon-carbon double bond
 3,330 cm.$^{-1}$: secondary amine.

This compound is not described in the literature.

Step C: Preparation of the γ-lactone of d,1-6H,7H-cis - 7 - tritylamino - desacetylcephalosporanic acid [I, R=$(C_6H_5)_3C$].—2.36 gm. of γ-lactone of 2-(carboxy-tritylamino-methyl) - 5 - hydroxymethyl-3,6-dihydro-2-H-1,3-thiazine-4-carboxylic acid, VII, were placed in suspension under agitation in 80 cc. of nitromethane. First 20 cc. of methylene chloride, then 10 cc. of M pyridine solution in nitro-methane and finally 1.2 gm. of dicyclohexylcarbodiimide were added to the mixture. Under total absence of light, the reaction mixture was then agitated for 3 days at room temperature. The insoluble dicyclohexylurea was removed by filtration, and the reaction mixture was concentrated to dryness under reducedp ressure. The residue was crystallized from a mixture of methylene chloride and methanol. The crystals were vacuum filtered and dried. Thus, 1.705 gm. of γ-lactone of d,l-6H,7H-cis-7-tritylamino-desacetylcephalosporanic acid were obtained with a melting point of 150–160° C. This product possesses a solvation of about 8%.

A sample, recrystallized from a mixture of methylene chloride and methanol, for the purpose of analysis, had the following characteristics.

Analysis.—$C_{27}H_{22}O_3N_2C$; molecular weight=454.53. Calculated (percent): C, 71.35; H, 4.8; N, 6.16; S, 7.06. Found (percent): C, 71.3; H, 5.0; N, 5.7; S, 6.8.

Infrared spectra (in chloroform):

Absorptions at:
 1,802 cm.$^{-1}$: γ-lactone, β-lactam
 1,773 cm.$^{-1}$: γ-lactone, β-lactam
 1,675 cm.$^{-1}$: carbon-carbon double bond.

This compound is not described in the literature.

EXAMPLE II

Preparation of γ-lactone of d,l-6H,7H-cis-7-amino-desacetylcephalosporanic acid [I, R=H]

(a) Preparation of the hydrochloride of the amine.— 720 mg. of γ-lactone of d,l-6H,7H-cis-7-tritylamino-desacetylcephalosporanic acid were dissolved in 7.2 cc. of nitromethane. The solution was adjusted to a temperature of about +5° C. A stream of hydrogen chloride was allowed to flow therethrough. The reaction mixture solidified into a solid mass, it was diluted with 7 cc. of ether and vacuum filtered. The precipitate was washed with ether. In this way, 355 mg. of hydrochloride of the γ-lactone of d,l-6H,7H-cis-7-amino - desacetylcephalosporanic acid were obtained. The product was utilized as such for the obtention of the free base as well as for the preparation of the 7-[2-thienylacetylamino] derivative.

(b) Preparation of the free base.—131 mg. of the hydrochloride previously obtained, Example II, paragraph a above, was dissolved in 0.5 cc. of methanol at room temperature. Next, 0.5 cc. of a molar solution of triethylamine in methanol were added. An immediate crystallization of the free base occurred. The crystals were vacuum filtered, washed with methanol and dried at a temperature of 100° C. A yield of 88 mg. of the γ-lactone of d,l-6H,7H-cis - 7 - amino-desacetylcephalosporanic acid (I, R=H) was obtained. The product had a melting point of 205–210° C.

Analysis.—$C_8H_8O_3N_2S$; molcular weight=212.22. Calculated (percent): C, 45.28; H, 3.80; N, 13.21; S, 15.11. Found (percent): C, 45.5; H, 4.0; N, 13.1; S, 14.9.

Infrared spectra (in Nujol):

Absorptions at:
 1,780, 1,740, 1,610 cm.$^{-1}$: carbonyl and carbon-carbon double bond
 3,390 and 3,310 cm.$^{-1}$: primary amine.

This product is not described in the literature.

EXAMPLE III

Preparation of the γ-lactone of d,1-7-[2-thientyl)-acetylamino]-desacetylcephalosporanic acid The γ-lactone [I, R=H], obtained as described in the preceding example, can be converted into γ-lactone of d,l-7-[2(-thienyl) - acetylamino] - desacetylcephalosporanic acid in the following fashion:

A mixture, consisting of 320 mg. of hydrochloride of γ-lactone of d,l-6H,7H-cis-7-amino - desacetylcephalosporanic acid, prepared according to Example II, paragraph (a), 12 gm. of ice, 4 cc. of an aqueous solution of sodium bicrbonate containing 10 gm. per 100 cc. and 0.30 cc. of thienylacetyl chloride, was vigorously agitated for 15 minutes. Thereafter, the precipitate formed was vacuum filtered, washed first with water, then with ether and dried. 414 mg. of γ-lactone of d,l17-[(2-thineyl)-acetylamino]-desacetylcephalosporanic acid were obtained, having a melting point above 280° C.

A sample, crystallized from a mixture of dimethyl-sulfoxide and methanol, for the purpose of analysis, exhibited the following characteristics:

Analysis.—$C_{14}H_{12}O_4N_2S_2$; molecular weight=336.4. Calculated (percent): C, 49.98; H, 3.60; N, 8.33; S, 19.06. Found (percent): C, 49.8; H, 3.9; N, 8.0; S, 19.0.

Infrared spectra (in Nujol):

Absorptions at:

1,786 cm.$^{-1}$: γ-lactone, β-lactam
1,761 cm.$^{-1}$: γ-lactone, β-lactam
1,651 cm.$^{-1}$: primary amide
1,538 cm.$^{-1}$: secondary amide N.M.R. spectra (deuteriated dimethylsulfoxide):

at 212 Hz.: substituted carbomethyl and thiomethylene
at 284 Hz.: methylene-oxy
at 284–289 Hz.: doublet with J≃5 cps. $H_6$
at 388–392–407–412–415 Hz.: ethylenic protons of the thienyl group This product is not described in the literature.

EXAMPLE IV

Preparation of the dextrorotatory γ-lactone of d-6H,7H-cis-7-amino-desacetylcephalosporanic acid (I, R=H)

(a) Preparation of dextrorotatory salt of the dextrorotatory γ-lactone of d-6H,7H-cis-7-amino-desacetylcephalosporanic acid with (+) tartaric acid.—At a temperature of about 50° C., a suspension of 1.24 gm. of hydrochloride of the γ-lactone of d,l-6H,7H-cis-7-amino-desacetylcephalosporanic acid (Example II, Step (a) in 10 cc. of a M/2 solution of (+) sodium bitartrate in water was vigorously agitated for one minute. The agitation was continued, first for 30 minutes at 20° C., then for 40 minutes at 5° C. The precipitated salt was vacuum filtered, washed first with water, then with ether and dried. Thus, 702 mg. of the desired dextrorotatory salt of the dextrorotatory γ-lactone of d-6H,7H-cis-7-amino-desacetyl-cephalosporanic acid with (+) tartaric acid in crystallized form were obtained, having a melting point of about 210° C. with a specific rotation $[\alpha]_D^{24}=+110°\pm5°$ (c.=1 part per thousand in water).

This salt could also be prepared by agitating a suspension of 212 mg. of γ-lactone of d,l-6H,7H-cis-7-amino-desacetylcephalosporanic acid and of 151 mg. of (+) tartaric acid in 2 cc. of distilled water, first for 30 minutes at 20° C., then for 40 minutes at 5° C. Thereafter, the salt formed was vacuum filtered, washed first with ice water, then with ether and dried. In this manner, the desired tartarate salt was obtained, having a melting point of about 210° C. and a specific rotation $[\alpha]_D^{24}=+110°\pm5°$ (c.=1 part per thousand in water).

(b) Preparation of the dextrorotatory γ-lactone of d-6H,7H-cis-7-amino-desacetylcephalosporanic acid.—At a temperature of 20° C., a suspension of 625 mg. of the dextrorotatory tartrate salt, obtained above, in 3.5 cc. of a M solution of triethylamine in methanol was agitated for about 5 minutes. Then, the precipitate formed was vacuum filtered, washed with methanol and dried under vacuum. Thus, 326 mg. of the dextrorotatory γ-lactone of d-6H,7H-cis-7-amino-desacetylcephalosporanic acid were obtained, with a melting point of about 220° C. and a specific rotation $[\alpha]_D^{24}=+248°\pm6°$ (c.=0.1 part per thousand in water). This compound could be recrystallized from nitromethane, first by dissolution at a high temperature, then by addition of ether. The compound occurred in the form of colorless hexagonal prisms.

This compound is not described in the literature.

EXAMPLE V

Preparation of the levorotatory γ-lactone of l-6H, 7H-cis-7-amino-desacetylcephalosporanic acid Example IV described the preparation of the dextrorotatory salt of the dextrorotatory γ-lactone of d-6H,7H-cis - 7 - amino-desacetylcephalosporanic acid with (+) tartaric acid. The mother liquors after removal of this salt, containing the diastereoisomer, corresponding to the antipodal γ-lactone, were acidified with an excess of normal hydrochloric acid and concentrated under vacuum. The residue obtained was taken up with 100 volumes of nitro-methane and an excess of a 10% solution of sodium bicarbonated in water. The organic phase was decanted, dried and evaporated to dryness. By taking the residue up with methanol, the levorotatory γ-lactone of l-6H,7H-cis-7-amino-desacetylcephalosporanic acid was obtained in crystallized form. This product could be purified by recrystallization from nitromethane or by intermediate formation of its salt with (−) tartaric acid and by decomposition of this salt. The product had the following constants: a melting point of about 220° C. and a specific rotation $[\alpha]_D^{24}=-248°\pm6°$ (c.=0.1 part per thousand in water).

This compound is not described in the literature.

EXAMPLE VI

Preparation of the N-trityl derivative of the dextrorotatory γ - lactone of d - 6H,7H-cis-7-amino-desacetylcephalosporanic acid 2 cc. of nitromethane, 0.25 cc. of pyridine and 418 mg. of trityl chloride were added to 212 mg. of the dextrorotatory γ - lactone of d - 6H,7H - cis-7-amino-desacetyl-cephalosporanic acid, and the mixture was agitated for 3 hours under an atmosphere of nitrogen. Thereafter, 5 cc. of water and 3 cc. of methylene chloride were added to the reaction mixture under continued agitation. The organic phase was separated by decanting, dried and concentrated to dryness under reduced pressure. The residue obtained was purified by crystallization from a mixture of methanol and ethyl ether, then from a mixture of methanol, ethyl ether and nitrobenzene.

In this manner, 340 mg. of the N-trityl derivative of the dextrorotatory γ-lactone of d-6H,7H-cis-7-amino-desacetylcephalosporanic acid were obtained. The product had a melting point of 222° C. and a specific rotation $[\alpha[_D=+160°\pm3°$ (c.=0.52% in chloroform).

Analysis.—$C_{27}H_{22}O_3N_2S$; molecular weight=454.52. Calculated (percent): C, 71.35; H, 4.87; N, 6.16; S, 7.06. Found (percent): C, 71.6; H, 5.0; N, 6.0; S, 7.1.

The N-trityl derivative of the levoratatory γ-lactone of l-6H,7H-cis-7-amino-desacetylcephalosporanic acid was obtained in an analogous fashion by starting with the corresponding levoratatory γ-lactone, prepared as described in Example V.

This compound is not described in the literature.

We claim:

1. A compound selected from the group consisting of (1) a racemic 6H,7H - cis - 7-amino-desacetylcephalo-sporanic acid derivative of the formula

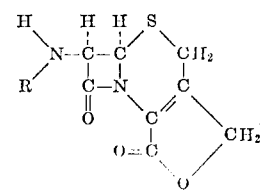

wherein R is selected from the group consisting of hydrogen and triphenylmethyl, (2) its optically active antipodes and (3) when R is hydrogen their acid addition salts.

2. The racemic compound of claim 1 wherein R is hydrogen.

3. The dextrorotatary compound of claim 1 wherein R is hydrogen.

4. The lavoratatory compound of claim 1 wherein R is hydrogen.

5. The racemic compound of claim 1 wherein R is triphenylmethyl.

6. The dextrorotatory compound of claim 1 wherein R is triphenylmethyl.

7. The lavoratatory compound of claim 1 wherein R is triphenylmethyl.

8. A process for the production of a γ-lactone of the 6H,7H-cis-7-amino-desacetylcephalosporanic acid derivative selected from the group consisting of (1) a racemic compound of the formula

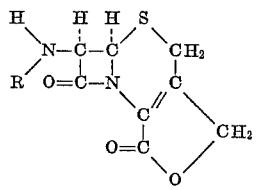

wherein R is selected from the group consisting of hydrogen and triphenylmethyl, (2) its optically active antipodes and (3) when R is hydrogen, its acid addition salts, which consists essentially of the steps of (1) subjecting a compound selected from the group consisting of the lactone of 2-(ter-butoxycarbonyl-aminomethyl)-5-hydroxymethyl - 3,6 - dihydro - 2-H-1,3-thiazine-4-carboxylic acid and its acid addition salts to the action of an acid in an anhydrous medium (2) reacting the resulting γ-lactone of 2-(carboxyaminomethyl)-5-hydroxymethyl - 3,6 - dihydro - 2-H-dihydro-2-H-1,3-thiazine-4-carboxylic acid with triphenylmethyl chloride in the presence of a basic agent selected from the group consisting of an alkali metal hydroxide, diethylamine and triethylamine in water and an organic solvent medium (3) reacting the resulting γ-lactone of 2 - (carboxy-triphenyl-methylaminomethyl)-5-hydroxymethyl - 3,6 - dihydro-2-H-1,3-thiazine-4-carboxylic acid with an agent activating the carboxylic function selected from the group consisting of a dialkyl carbodiimide, a dicycloalkyl carbodiimide and ethoxyacetylene in the presence of a relatively weakly basic tertiary amine selected from the group consisting of pyridine, collidine and dialkylaniline in at least one strongly polar nonhydroxylated solvent, and (4) recovering said γ-lactone of the 6H,7H - cis - 7 - amino-desacetylcephalosporanic acid derivative.

9. The process of claim 8, step 1, wherein said acid in an anhydrous medium is an acid selected from the group consisting of hydrochloric acid, hydrobromic acid, p-toluenesulfonic acid, a mixture of hydrobromic acid and acetic acid and trifluoroacetic acid in an anhydrous medium selected from the group consisting of benzene, toluene, ethyl ether, dioxane, nitromethane, chloroform and methylene chloride.

10. The process of claim 8, step 2, wherein said organic solvent is selected from the group consisting of ethyl ether and a lower alkanol.

11. The process of claim 8, step 3, wherein said strongly polar nonhydroxylated solvent is selected from the group consisting of nitroalkanes, acetone, and acetonitrile.

12. The process of claim 8, step 4, wherein said recovery step comprises subjecting the resulting γ-lactone of d,l - 6H,7H - cis - 7-triphenylmethylamino-desacetylcephalosporanic acid to the action of an acidic agent to obtain racemic γ-lactone of 6H,7H-cis-7-amino-desacetyl-cephalosporanic acid, reacting said racemic γ-lactone with an optically active acid selected from the group consisting of (+) tartaric acid, (+) dibenzyltartaric acid, (+) glutamic acid and (+) camphosulfonic acid, the two diastereoisomeric salts are separated and decomposed and the optically-active γ-lactones of 6H,7H-cis-7-amino-desacetyl-cephalosporanic acid are obtained.

13. The γ-lactone of 2-(carboxy-aminomethyl)-5-hydroxymethyl-3,6 - dihydro - 2-H-1,3-thiazine - 4 - carboxylic acid.

14. The γ-lactone of 2 - (carboxy-triphenyl-methyl-aminomethyl) - 5 - hydroxymethyl-3,6-dihydro-2-H-1,3-thiazine-4-carboxylic acid.

15. The γ-lactone of d,l-6H,7H-cis-7-(2-thienyl-acetyl-amino)-desacetyl-cephalosporanic acid.

16. The process of cyclizing a γ-lactone of 2-(carboxy-triphenylmethylamino-methyl) - 5 - hydroxymethyl-3,6-dihydro-2-H-1,3-thiazine-4 - carboxylic acid which consists essentially of the steps of reacting a γ-acetone of 2-(carboxy-triphenylmethylamino-methyl) - 5 - hydroxymethyl-3,6-dihydro-2-H1,3-thiazine - 4 - carboxylic acid with an agent activating the carboxylic function selected from the group consisting of a dialkyl carbodiimide, a desacycloalkyl carbodiimide and ethoxyacetylene in the presence of a relatively weakly basic tertiary amine in at least one strongly polar nonhydroxylated solvent and recovering a γ-lactone of d,l-6H,7H-cis-7-triphenylmethylamino-desacetyl-cephalosporanic acid.

References Cited

UNITED STATES PATENTS

| 3,079,142 | 2/1963 | Hoover | 260—243 C |
| 3,173,163 | 3/1965 | Shull et al. | 260—243 C |
| 3,216,999 | 11/1965 | Flynn | 260—243 C |
| 3,270,009 | 8/1966 | Flynn | 260—243 C |

NICHOLAS S. RIZZO, Primary Examiner